US008686336B2

(12) United States Patent
Errebo et al.

(10) Patent No.: US 8,686,336 B2
(45) Date of Patent: Apr. 1, 2014

(54) MEASURING AND COMPENSATING FOR LIGHT INTENSITY IN AN OPTICAL SCANNER

(75) Inventors: Lars Errebo, Roskilde (DK); Nis Engholm, Fredensborg (DK)

(73) Assignee: Contex A/S, Allerod (DK)

( * ) Notice: Subject to any disclaimer, the term of this patent is extended or adjusted under 35 U.S.C. 154(b) by 241 days.

(21) Appl. No.: 12/866,126

(22) PCT Filed: Feb. 6, 2009

(86) PCT No.: PCT/EP2009/051376
§ 371 (c)(1),
(2), (4) Date: Nov. 2, 2010

(87) PCT Pub. No.: WO2009/138255
PCT Pub. Date: Nov. 19, 2009

(65) Prior Publication Data
US 2011/0036968 A1    Feb. 17, 2011

Related U.S. Application Data

(60) Provisional application No. 61/028,248, filed on Feb. 13, 2008.

(30) Foreign Application Priority Data

Feb. 6, 2008    (DK) ................. PCT/DK2008/000055

(51) Int. Cl.
*H01L 27/00*    (2006.01)
*H04N 1/46*    (2006.01)

(52) U.S. Cl.
USPC ....................... 250/208.1; 358/504

(58) Field of Classification Search
USPC ................ 250/208.1, 235; 358/482, 504
See application file for complete search history.

(56) References Cited

U.S. PATENT DOCUMENTS

| 5,162,644 | A | * | 11/1992 | Nagata et al. | ............... 250/208.1 |
| 5,272,548 | A | * | 12/1993 | Kawai et al. | .................. 358/482 |
| 6,195,183 | B1 | * | 2/2001 | Fujimoto et al. | ............... 358/514 |
| 6,744,469 | B1 | | 6/2004 | Gudenburr et al. | |
| 6,994,462 | B2 | * | 2/2006 | Pesenti | ........................... 362/610 |
| 7,864,381 | B2 | * | 1/2011 | Scott | ........................... 358/474 |
| 2007/0206244 | A1 | * | 9/2007 | Kobayashi | ................... 358/514 |
| 2007/0216747 | A1 | | 9/2007 | Blair et al. | |

FOREIGN PATENT DOCUMENTS

| JP | 60-123156 A | 7/1985 |
| JP | 62-137967 A | 6/1987 |
| JP | 2003-338904 A | 6/1987 |

(Continued)

OTHER PUBLICATIONS

Japanese Office Action for corresponding Japanese Patent Application No. 2010-545481 mailed Aug. 20, 2013.

*Primary Examiner* — Thanh Luu
(74) *Attorney, Agent, or Firm* — Merchant & Gould P.C.

(57) ABSTRACT

Disclosed is a device for optical scanning, comprising: a plurality of photo sensors, where the photo sensors are arranged to detect light incident on the photo sensors, emitted from a light source and reflected from an object subject to optical scanning; wherein the amount of light received at least one of the photo sensors is to a larger extent light transmitted from the light source; and to a smaller extent light reflected from the object.

33 Claims, 12 Drawing Sheets

(56) References Cited

FOREIGN PATENT DOCUMENTS

| | | |
|---|---|---|
| JP | 63-057263 A | 3/1988 |
| JP | 63-276962 A | 11/1988 |
| JP | 3-216060 A | 9/1991 |
| JP | 9-065140 A | 3/1997 |
| JP | 9-243338 A | 9/1997 |
| JP | 2003-504682 A | 2/2003 |
| JP | 2005-283217 A | 10/2005 |
| JP | 2007-208332 A | 8/2007 |
| JP | 2007-266981 A | 10/2007 |
| WO | WO 01/04579 | 1/2001 |

* cited by examiner ent or the difference between black/white densities of the scanned document itself. When using an illuminating light-emitting diode (LED) array driven by a constant voltage, the emitting luminance changes according to an individual difference of the emitting efficiency, temperature characteristics and aging characteristics of the LED array, and therefore the illumination intensity on the document surface changes, which leads to a change in the black/white amplitude of an image signal.

MEASURING AND COMPENSATING FOR LIGHT INTENSITY IN AN OPTICAL SCANNER

This application is a National Stage Application of PCT/EP2009/051376, filed Feb. 6, 2009, which claims benefit of Serial No. PCT/DK2008/000055, filed Feb. 6, 2008 with the International Bureau and claims benefit of Ser. No. 61/028,248, filed Feb. 13, 2008 in the United States and which applications are incorporated herein by reference. To the extent appropriate, a claim of priority is made to each of the above disclosed applications.

FIELD OF THE INVENTION

This invention generally relates to optical scanning of an object. More particularly, the invention relates to a device for optical scanning, comprising a plurality of photo sensors, where the photo sensors are arranged to detect light incident on the photo sensors, emitted from a light source and reflected from an object subject to optical scanning.

BACKGROUND OF THE INVENTION

An optical scanner may advantageously use a contact image sensor (CIS) element or device as the image sensors. The illumination in a contact image sensor may be provided by light-emitting diodes (LEDs) which are very precise components and may therefore be suitable for use in scanners, such as large format scanners. By using LEDs as the illumination source, the CIS will be highly power efficient. However, a problem with light emitted from LEDs is that the efficiency and thereby the light intensity of the LEDs vary with temperature and changes due to aging of the LEDs. This may result in a reduction in the quality of the scanned image. A similar reduction in the quality of a scanned image may also occur when using other light sources than LEDs due to aging and/or temperature variations.

JP60123156 relates to a contact image sensor with a light-emitting diode array used as the illumination source. The contact image sensor comprises a feedback system for controlling the current to the light-emitting diode array. The black/white amplitude of an image signal inputted into an automatic gain control (AGC) fluctuates according to the illumination intensity for a document optical transmissibility of the imaging system, sensitivity of the photoelectric conversion element or the difference between black/white densities of the scanned document itself. When using an illuminating light-emitting diode (LED) array driven by a constant voltage, the emitting luminance changes according to an individual difference of the emitting efficiency, temperature characteristics and aging characteristics of the LED array, and therefore the illumination intensity on the document surface changes, which leads to a change in the black/white amplitude of an image signal.

In order to control the current to the LED, the contact image sensor is equipped with a light quantity detector, a reference voltage generator, a differential amplifier and a conducted current control unit, which operate to keep the light quantity of the illuminating LED array constant via a feedback control. The invention operates as follows: the light quantity detector detects a portion of an irradiated light emitted from the illuminating LED array and inputs a voltage output corresponding to the illumination density of the document surface into the differential amplifier. The differential amplifier differentially amplifies a voltage corresponding to the reference document illumination density outputted from the reference voltage generator and the output of the light quantity detector, and controls the current conducted to the illuminating LED array via the conducted current control circuit, such that the difference between the two becomes zero. Through such feedback control, the illumination density of the document surface by the irradiated light emitted from the illuminating LED array can be kept constant. Therefore, the AGC does not need to have a function of correcting the illumination density of the document, and it is thus possible to set the dynamic range narrower and avoid a false correction of continuous black signals to white signals.

It remains a problem to improve detection, measurement and compensation for intensity variations from a light source in a scanning element, such as a contact image sensor.

SUMMARY

Disclosed is a device for optical scanning, comprising:
a plurality of photo sensors, where the photo sensors are arranged to detect light incident on the photo sensors, emitted from a light source and reflected from an object subject to optical scanning;
wherein the amount of light received at least one of the photo sensors is:
  to a larger extent light transmitted from the light source; and
  to a smaller extent light reflected from the object.

Consequently, it is an advantage that the light being received in the at least one photo sensor is, to a relatively larger extent, light being transmitted from the light source and, to a relatively smaller extent, light that is being reflected or refracted from the object subject to scanning. The light source emits light, and a portion of the light hits the object, and another portion of the light hits the at least one photo sensor.

The at least one photo sensor may be a number of photo sensors, which is substantially small in relation to the total number of the plurality of photo sensors.

A larger extent may be such as 50%, or such as 60%, or such as 70%, or such as 80%, or such as 90% or more, and a smaller extent may be such as 40%, such as 30%, such as 20%, such as 10% or less.

Alternatively or additionally, the amount of light received at least one of the photo sensors may:
  predominantly be light transmitted from the light source; and
  an insignificant portion of light reflected from the object.

A predominantly amount may be such as 70%, such as 80%, such as 90% or more, and an insignificant portion may be such as 20%, such as 10% or less. By means of the at least one photo sensor, the light intensity of the light source can be measured, because light is received from the light source and is not being reflected from the object subject to scanning. On the contrary, the rest of the plurality of the photo sensors, which may advantageously be the predominantly part of the plurality of photo sensor, measures the light intensity of the light reflected or refracted from the object subject to scanning. The light received from the object, which is due to the reflection or refraction of light transmitted to the object from the light source, is used to create images of the object by means of the photo sensors, as traditional optical scanners do. Furthermore, the light which scanners receive at their photo sensors is light, which is a result of both the light being transmitted from the light source and then the reflection or refraction of this light from the object. I.e. both the light source itself and the object subject to scanning contribute to the light intensity which is received in the photo sensors. The light source has a light intensity, and when the light is reflected or refracted from the object subject to scanning, the light intensity is affected and may be changed.

The expressions "reflected light" or "reflection of light" may also include refracted light, transmitted light, refraction of light, transmission of light and/or the like.

Furthermore, the light intensity of a light source, such as a light-emitting diode (LED), may vary with the temperature of the light source and may vary due to aging of the light source, and this system enables that the light intensity of the light source may be measured continuously during a scanning process.

The measurement of the light intensity of the light source may be used to compensate for the scanning and imaging of the object. By correcting or compensating for the image data obtained from the scanning of the object according to the measured light intensity of the light source, the drawbacks of the varying light intensity of the light source may be overcome and eliminated. By compensating for the varying light intensity a better colour intensity in the scanned image can be obtained, and a more uniform and homogenous quality of the scanned image may also be obtained.

The device for optical scanning may provide a transparent path from the light source to the at least one photo sensor. The transparent path may provide that an optical feedback path is provided, whereby the image data from the scanning of the object subject to scanning can be compensated for by means of the continuously measured light intensity of the light source.

Furthermore, the start-up of the scanner may be faster when the light intensity of the light source can be measured, since the scanner does not need to be warm before starting a scanning process.

A yet further advantage is that this solution for continuously measuring the light intensity of the light source may be inexpensive, whereby the solution may be advantageous to implement in many scanners, new scanners as well as existing scanners.

Light transmitted from the light source means light which is not being reflected by the object subject to scanning.

The object reflects light to the photo sensors which it receives from the light source, but if the object also received light from a different source than the light source of the system, a measurement of the light intensity of the light source of the system may still be performed as a result of the configuration of the device for optical scanning.

In one embodiment the device further comprises means to:
transmit light received from the light source to the at least one of the photo sensors; and to
shield the at least one of the photo sensors from light reflected from the object. It is an advantage that means are provided which are configured to transmit or reflect light from the light source to at least one photo sensor and shield the at least one of the photo sensors from light reflected from the object to be scanned, since this enables that the at least one photo sensor can receive light from the light source, which is not reflected from the object to be scanned, whereby the at least one photo sensor may obtain data output substantially relating only to the light source, as opposed to the rest of the photo sensors. Preferably, the rest of the photo sensors constitute the majority of photo sensors of the device, and the means which transmit or reflect and shield light preferably shield a minority of the photo sensors.

By the means, light may be transmitted along the transparent path from the light source to the at least one photo sensor.

In one embodiment said means comprises one or more units.

In one embodiment the one or more units perform one or more of the functions which said means are configured to perform. It is an advantage that either one or more units may transmit light to the at least one of the photo sensors, the light being received from the light source, and shield the at least one of the photo sensors from light reflected from the object. One single unit may perform both the transmission of light from the light source to the at least one photo sensor and the shielding of light reflected from the object, and this unit may then be denoted a light-reflecting unit. Alternatively, one unit may perform the transmission of light from the light source to the at least one photo sensor, and a different unit may perform the shielding of light reflected from the object. Alternatively, more units may jointly perform the transmission of light from the light source to the at least one photo sensor, and/or more units may jointly perform the shielding of light reflected from the object.

In one embodiment, at least one of the one or more units has two opposite faces, one facing the at least one photo sensor and the light source, the other facing the object to be scanned. An advantage of this embodiment is that the at least one of the one or more units has/have two opposite faces, whereby the two faces may have different properties which may satisfy the different requirements that the unit can fulfil. E.g. the face of the unit pointing in the direction of the photo sensor(s) and light source may have reflective properties for sending the light towards the photo sensor, whereas the face pointing in the direction of the object to be scanned may have properties for preventing that light from the object is transmitted to the photo sensor(s). Hereby, it may be possible to use the unit for measuring the light from the light source, without measuring reflected light from the object subject to scanning. Furthermore, the unit may be a planar face.

In other words, the unit is arranged to provide a light ray path from the light source to the at least one of the photo sensors such that light from that light ray path is a dominant portion of light incident on the first photo sensor. Hereby the majority of light incident on the at least one photo sensor will be received from the unit and not from the scanned object.

In one embodiment at least one of the one or more units has such extent that it covers a part of said device. It is an advantage that the at least one of the one or more units cover(s) a part of said device, since in this way, it may be enabled that light can be reflected and sent to the at least one photo sensor according to the above.

In embodiments of the invention at least one of the one or more units is adapted to provide an optical feedback used for measuring the light intensity of the light source. It is an advantage that the light intensity of the light source can be measured by means of an optical feedback, since a measure of the light intensity can be used to correct and compensate for the output of the image data of the scanning as described above.

In embodiments of the invention the measured light intensity is used to compensate for the output of the optical scanning. It is an advantage that the output, i.e. image data, of the optical scanning can be compensated for, since thereby the colour intensity and/or quality of the images may be improved.

In one embodiment compensating for an output comprises compensating for an output from the plurality of photo sensors in an open-loop. It is an advantage that the output of the photo sensors is compensated for, since thereby the electric current used for the scanner can be held constant, and thereby the optical spectrum of the light source can also be held constant. When the optical spectrum of the light source is constant, the variations in the light source may substantially be due to temperature variations and/or aging, whereby the compensation of the light intensity may be facilitated in relation to compensating for the light intensity, when a higher number of variables is present, e.g. such as when e.g. electric voltage is also changed.

The compensation may be performed as follows: The at least one of the one or more units transmits the light from the light source in the CIS element to the at least one of the photo sensors. A pre-calibration of the scanning device provides that the system contains information about the light output after stabilization of the light source. The light output may be defined as being stabilized at infinite time, i.e. in the limit where time goes towards infinity. In the light compensating or correcting part of the system, the output is incremented or decremented, so that the measured light output corresponds with the light at infinite time. This compensation or correction is performed on all pixels of the CIS element, and the result is thereby that the CIS element is completely light-compensated.

In one embodiment compensating for an output comprises controlling and compensating a light source control of the light source in a closed-loop. It is an advantage that the light source is controlled since, by controlling the light source, the light intensity of the light source can be adjusted, so that the variations in colour intensity and quality of the scanned image due to temperature variations and aging can be improved.

In one embodiment the device is arranged in a pattern with a number of other similar devices, whereby at least two or more devices have mutual overlap areas. It is an advantage that at least two devices have mutual overlap areas, since these mutual overlap areas results in that the overlap area of one of two devices will be unused with regard to the optical scanning of an object, since the overlap area of the other or second of the devices can be used for optical scanning of that area, e.g. an area of a document to be scanned. The pattern in which the devices are arranged may be a zig-zag pattern. When a device for scanning has an area which is not used for the scanning, this area may be used for other purposes, such as used for the provision of an optical feedback path for measuring the light intensity of the light source of the scanner.

In one embodiment the part of said device which at least one of the one or more units covers, is a part of said device which is in an overlap area in relation to a second device, the second device being similar to said device, whereby the overlap area of one of the devices is not used for scanning the document. It is an advantage that the at least one of the one or more units covers an overlap area of two devices since, by arranging the unit in an overlap area, the unit may be used to measure the light intensity of the light source of one of the devices, while the corresponding overlap area on the other device is used for scanning the object.

In embodiments of the invention at least one of the one or more units is at least partially covered with a reflective material. It is an advantage that the at least one of the one or more units is covered with a reflective material, since the unit is configured to reflect light from the light source to at least one of the photo sensors in the device, and the reflective material may provide reflection of light.

In one embodiment the reflective material is at least partially an optical lightning film. It is an advantage to provide an optical lightning film for reflecting light, since an optical lightning film may have properties which may enable light reflection.

In one embodiment the optical lightning film is at least partially a polycarbonate film. It is an advantage to provide a polycarbonate film, since a polycarbonate film may have light-reflecting properties.

In one embodiment at least one of the one or more units at least partially comprises opaque white plastic. It is an advantage to provide opaque white plastic, since this material may provide light reflection.

In one embodiment at least one of the one or more units is at least partially chromed with a reflective material. It is an advantage to chrome or galvanize the unit with a reflective material, since this enables that the at least one of the one or more units may provide light reflection.

In one embodiment at least one of the one or more units transmits light by means of a reflector. It is an advantage to transmit light by means of a reflector, since reflectors may result in reflection of a wave front such as a light wave.

In one embodiment the reflector is a mirror. It is an advantage to transmit light by means of a mirror, since mirrors may result in reflection of light.

In one embodiment the reflector is a reflective foil. It is an advantage to transmit light by means of a reflective foil, since reflective foils may result in reflection of light.

In one embodiment the reflector is metallised plastic. It is an advantage to transmit light by means of metallised plastic, since metallised plastic may result in reflection of light.

In one embodiment at least one of the one or more units comprise)s) a light guide. It is an advantage to transmit light by means of a light guide, since light guides may result in transportation of light. Alternatively, light may be transmitted by means of a light pipe, a light tube or the like.

In one embodiment the light guide is a prism light guide. It is an advantage to transmit light by means of a prism light guide, since prism light guides may result in reflection or refraction of light In one embodiment at least one of the one or more units provide(s) that light exits the at least one unit as specularly reflected light.

In one embodiment at least one of the one or more units provides that light exits the at least one unit as diffuse, reflected light.

In one embodiment a silk-screen printed white patch of one of the one or more units provides diffuse, reflected light.

In one embodiment a matte end face of one of the one or more units provides the diffuse, reflected light.

In one embodiment at least one of the one or more units is attached at one end of the device. It is an advantage that the at least one of the one or more units is attached in an end of the device, since thereby the unit may cover an overlap end of the device. Alternatively, the unit may be attached at any suitable place, where it may provide an optical feedback path.

In embodiments of the invention the light source comprises one or more light-emitting diodes. It is an advantage to use light-emitting diodes (LEDs) as the light source in a scanning device, since light emitted from a LED may be a very precise component due to the light being narrow-spectrum light. Furthermore, the colour of the light emitted from a LED depends on the composition and condition of the semiconducting material used, whereby the colour of the light can be adjusted in accordance with a desired colour. Additionally, a LED may be a small area source, and it may be provided with extra optics that shape its radiation pattern. Yet a further advantage of using LEDs as light source is that LEDs may be inexpensive.

In embodiments of the invention the device is a contact image sensor. It is an advantage that the device is a contact image sensor (CIS), since a CIS may use low power compared to a charge-coupled device (CCD), which also may be used in an optical scanning device. Instead of using mirrors to reflect light to a sensor as in conventional CCD scanners, a CIS element places the image photo sensors in near direct contact with the object subject to scanning.

In embodiments of the invention the device further comprises:
- a light guide which directs the light from the light source to illuminate the object subject to scanning;
- an array of rod lenses for collecting and directing the light that is reflected back from the object; and
- where the plurality of photo sensors are arranged in an array and are adapted to receive the light from the rod lenses.

It is an advantage that the device for optical scanning further comprises a light guide and an array of rod lenses, since a light guide guides/directs light from the light source to an object, a unit, a surface etc., from where the light may be reflected to the array of rod lenses. A rod lens may collect light rays and send them to the array of photo sensors, whereby an image of the scanned object may be created. Furthermore, the rod lens optical system is 1:1, i.e. there is no enlargement or reduction of the imaging. Additionally, the light source may be an integrated part of the light guide.

In one embodiment the rod lenses are arranged in a pattern with parallel rows of lenses, where the lenses in a row are displaced relative to the lenses in a neighbour row.

It is an advantage to arrange the rod lenses in such a pattern, since this pattern optimizes utilisation of the available space in the rod lens array. The rod lenses may be displaced a half diameter of their diameter, and the pattern may resemble a honeycomb pattern.

In one embodiment the rod lenses are SELFOC lenses. It is an advantage that the rod lenses are SELFOC lenses, since in a SELFOC lens the index of refraction is gradually varied within the lens material, whereby light rays can be smoothly and continuously redirected towards a point of focus, and hereby a real image may be formed on the physical surface of the lens.

Alternative solutions to the problem of measuring the light intensity of the light source in an optical scanner may be obtained by providing a software model with input from a temperature sensor. By means of this solution, current and thereby optical spectrum can also be held constant.

Alternatively, a solution may be obtained by providing an extra light source which simulates the primary light source in the device that illuminates the document to be scanned. By means of this solution, regulation of the primary light source is enabled by measurements on the extra light source in order to compensate the output of the photo sensors of the CIS.

Alternatively, an automatic gain control (AGC) system for maximising the dynamic range in the apparatus may be provided to compensate for the light intensity. In such a closed-loop system, the light intensity may be used to control the gain by operating as an inverted aperture. I.e. when the light intensity is low, the gain may be increased, and when the light intensity is high, the gain may be reduced. In this solution the gain may be adjusted constantly.

The present invention relates to different aspects including the device for optical scanning described above and in the following, and corresponding methods, uses, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

According to one aspect a scanner comprising a number of the devices is disclosed.

In embodiments of this aspect, at least a number of the number of devices are arranged in a pattern whereby at least two or more of the devices have mutual, corresponding or respective overlap areas.

According to another aspect a method for optical scanning is disclosed herein, comprising the steps of:
- detecting light incident on a plurality of photo sensors by means of the photo sensors, the light being emitted from a light source and reflected from an object subject to optical scanning;
- wherein the method further comprises:
- receiving at the least one of the photo sensors an amount of light which is:
- to a larger extent light transmitted from the light source; and
- to a smaller extent light reflected from the object.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
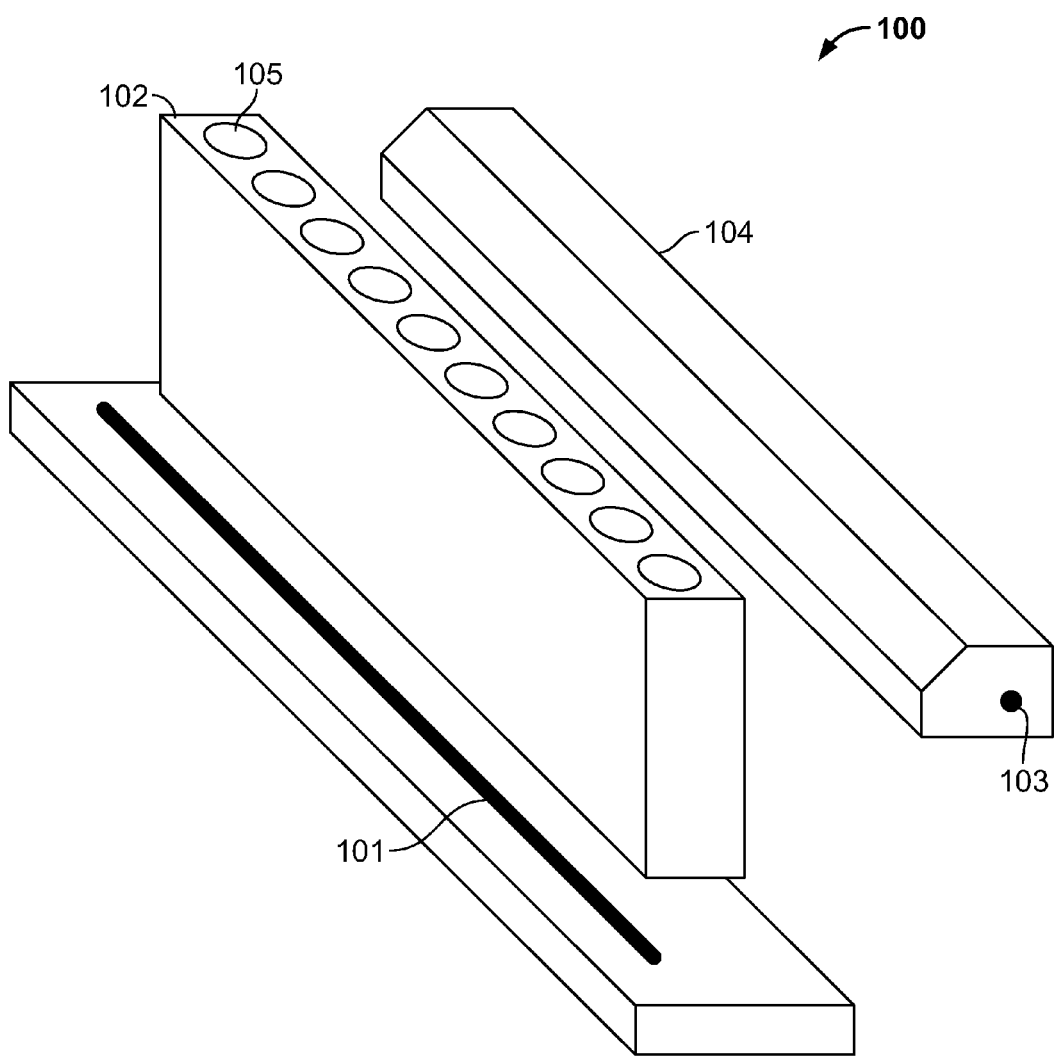
FIG. 1 shows an example of a contact image sensor.

FIG. 1 shows the contact image sensor (CIS) technology. A large format document scanner may be constructed by means of a number of contact image sensor (CIS) elements. A CIS element 100 consists of an array of photo sensors 101, an array of rod lenses 102, a light source 103, and a light guide 104. The light source 103 may e.g. be light emitting diodes (LEDs) shining down the light guide 104, which directs the light onto and illuminates the document or object to be scanned (not shown). The light source 103 may be integrated in the light guide 104. The document or object may be placed on a glass plate of the scanner. There may be three LEDs, e.g. a red, a green, and a blue LED. The LEDs may be strobed rapidly one at a time thereby providing the colour content in the scan. The light that is reflected back from the document is gathered by the array of rod lenses 102 and directed at the array of photo sensors 101. This light reflected from the document to be scanned and directed at the photo sensors 101 may be defined as the scanning light ray path of the CIS element 100.

By means of the light intensity and/or colours of the light received by the photo sensors 101, an image of the scanned document may be recorded by converting the light signal to an electrical signal.

The CIS element 100 may as mentioned be used with three light emitting diodes (LEDs) as the light source, but alternatively the CIS may be used with another suitable light source.

Alternatively, the LED light source may be a single white LED; a LED which emits light in one colour and where the LED is covered with a coloured coating, e.g. a LED which emits blue light and which is covered with a yellowish coating to give the impression of white light; a bipolar LED unit containing two diodes of different colour, thereby allowing two-colour operation or a range of apparent colours to be created; a LED unit containing two or more diodes of different colours arranged to be driven to different colours by having more than two electrodes; and/or the like.

The photo sensors 101, i.e. the light-sensing system, may be a silicon surface which is divided up into a plurality of discrete square cells, the size of each square cell being a fraction of an inch depending upon the required scanning resolution.

The optical system and imaging part is the rod lens array 102, and a rod lens 105 in an array 102 may be a SELFOC lens. The rod lens optical system is 1:1, i.e. there is no enlargement or reduction of the imaging. The rod lenses may be arranged in a pattern with parallel rows of lenses, where the lenses in a row are displaced relative to the lenses in a neighbour row. This pattern optimizes utilisation of the available space in the rod lens array. The rod lenses may be displaced a half diameter of their diameter, and the pattern may resemble a honeycomb pattern.

In a SELFOC lens, light rays follow sinusoidal paths until reaching the back surface of the lens, whereby a real image may be formed on the physical surface of the lens. The SELFOC lens utilizes a radial index gradient, where the index of refraction is highest in the center of the lens and decreases with radial distance from the axis. A conventional glass lens can bend light only at its surfaces. At the interface between air and glass, rays of light will change direction according to the abrupt change in the index of refraction. By controlling the shape and smoothness of the lens surface, the rays can be brought to a focus and form an image. Conversely, in a SELFOC lens the index of refraction is gradually varied within the lens material, whereby light rays can be smoothly and continuously redirected towards a point of focus. The controlled variation of the refractive index is achieved by a high-temperature ion exchange process within the glass host material. The SELFOC lens is a type of GRIN (Gradient Index) lens.

The document scanner may be a large format scanner, a flatbed scanner, a roller scanner, a feeder scanner or the like.

Figure 2A:
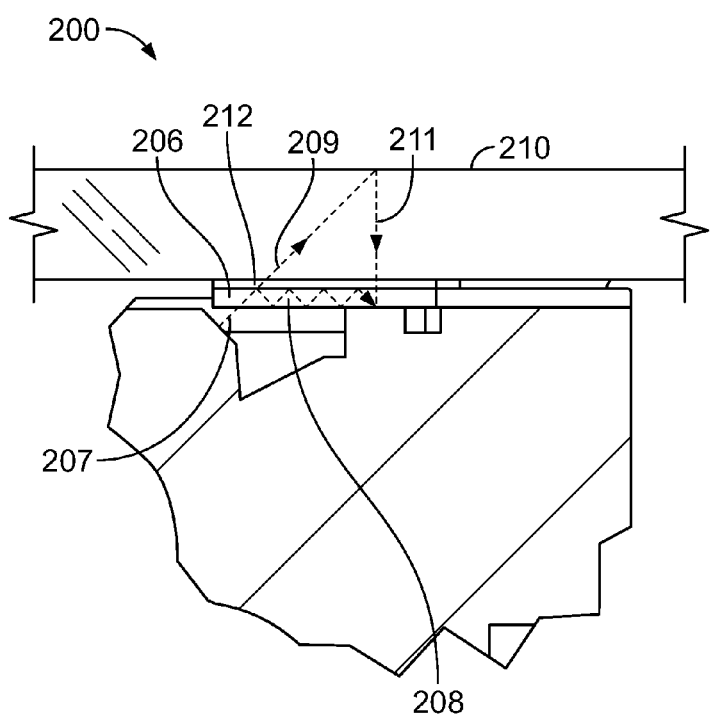
FIG. 2 shows the function and an example of the position of the light-reflecting unit.

FIG. 2*a*) shows the function of a light-reflecting unit 206 of a CIS element 200 according to the invention. Light 207 from the light source may be transmitted or reflected as light waves 208 by a light-reflecting unit 206. Transmission or reflection may e.g. take place by means of a cover or coating 212 on the light-reflecting unit 206, and light waves may be directed to corresponding rod lenses and photo sensors, whereby the light intensity of the light source may be measured. This light ray path may be defined as a modified light ray path in relation to the normal scanning light ray path of a CIS element, which is used for scanning the document. This scanning light ray path can be seen in FIG. 2*a*) as the light 209 from the light source, which is reflected or refracted at the glass plate 210 where the object to be scanned is placed. The light 211 reflected or refracted from the document is gathered by the array of rod lenses and directed to the array of photo sensors for recording an image of the scanned object.

The light-reflecting unit 206 may reflect, refract, transmit and/or guide light waves 208 from or through it, and the unit for reflecting light 206 may be constructed in any suitable way for preventing that a portion of light is sent to the object to be scanned, and to ensure that this portion of light is sent to at least one photo sensor, which may be a number of corresponding photo sensors for performing a measurement of the light intensity of the light source. The light-reflecting unit (LRU) is further described in relation to FIG. 4. Alternatively or additionally, other suitable means than a light-reflecting unit 206 as described in relation to FIG. 2*a*) may be provided for transmitting, reflecting and/or refracting light from the light source to the at least one photo sensor, and for shielding the at least one photo sensor from light reflected and/or refracted from the object subject to scanning. These other suitable means may comprise:

- one or more units comprising at least partially opaque white plastic, which may provide light reflection;
- one or more units transmitting light by means of a reflector, where a reflector may result in reflection of a wave front, such as a light wave. FIG. 2*c*) shows reflectors 213.
- the reflector can be a mirror which may result in reflection of light;
- the reflector can be a reflective foil which may result in reflection of light;
- the reflector can be metallised plastic which may result in reflection of light;
- one or more units comprising a light guide, a light pipe, a light tube or the like, which may result in transportation of light. FIG. 2*d*) shows a light guide 214.
- the light guide can be a prism light guide, which may result in reflection or refraction of light. FIG. 2*e*) shows a prism light guide 215.
- one or more units providing that light exits the at least one unit as specularly reflected light;
- one or more units providing that light exits the at least one unit as diffuse, reflected light;
- the diffuse, reflected light can be provided by a silk-screen printed white patch of the unit. FIG. 2*f*) shows a silk-screen printed white patch 217.
- the diffuse, reflected light can be provided by a matte end face of the unit.

In the following, the expression "light-reflecting unit" and "LRU" may include the alternative, suitable means and units described above.

Figure 2B:
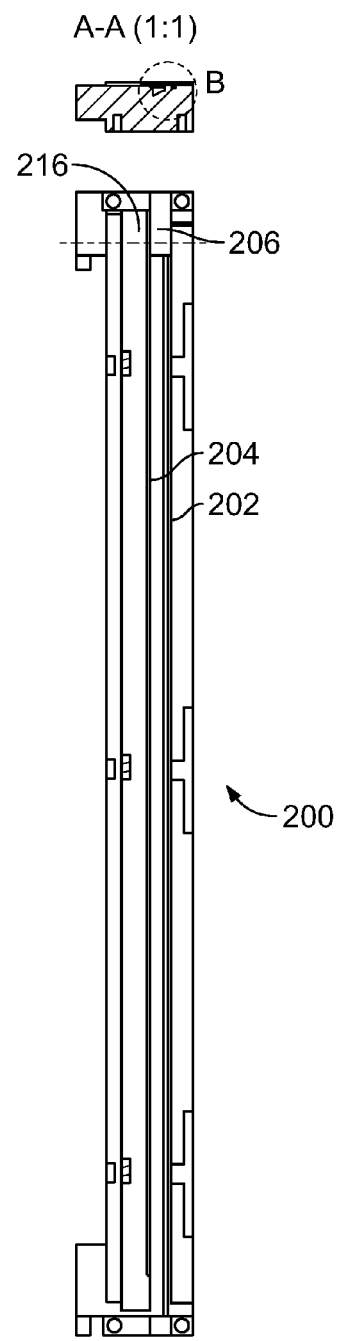
Figure 2C:
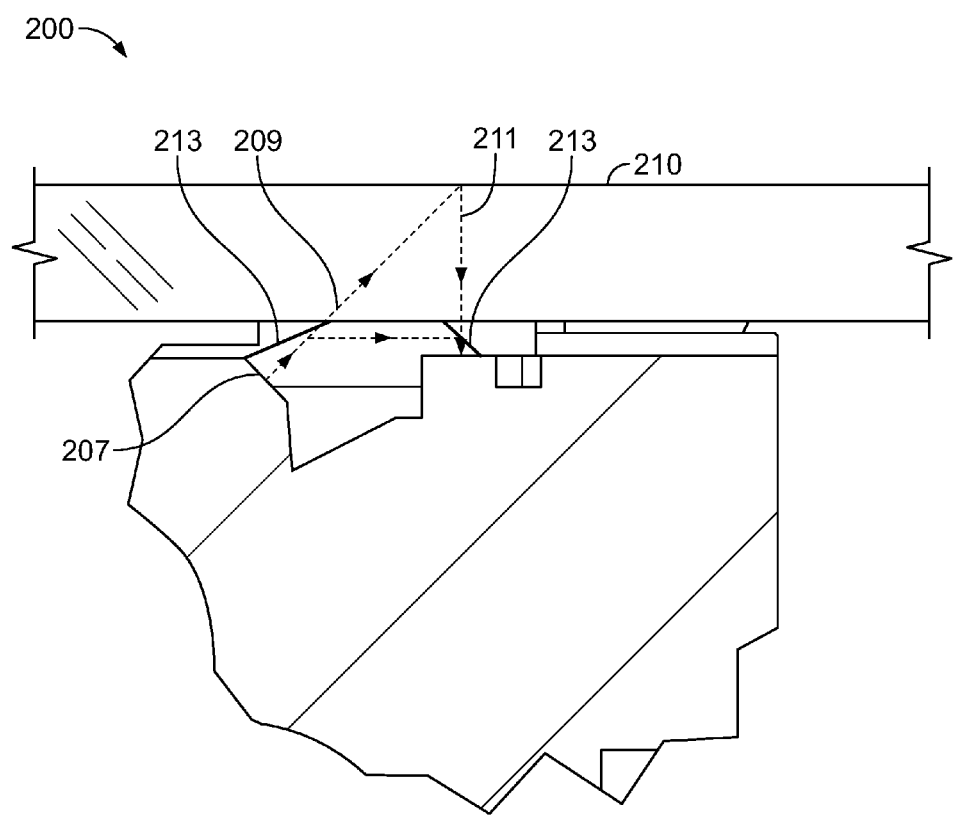
Figure 2D:
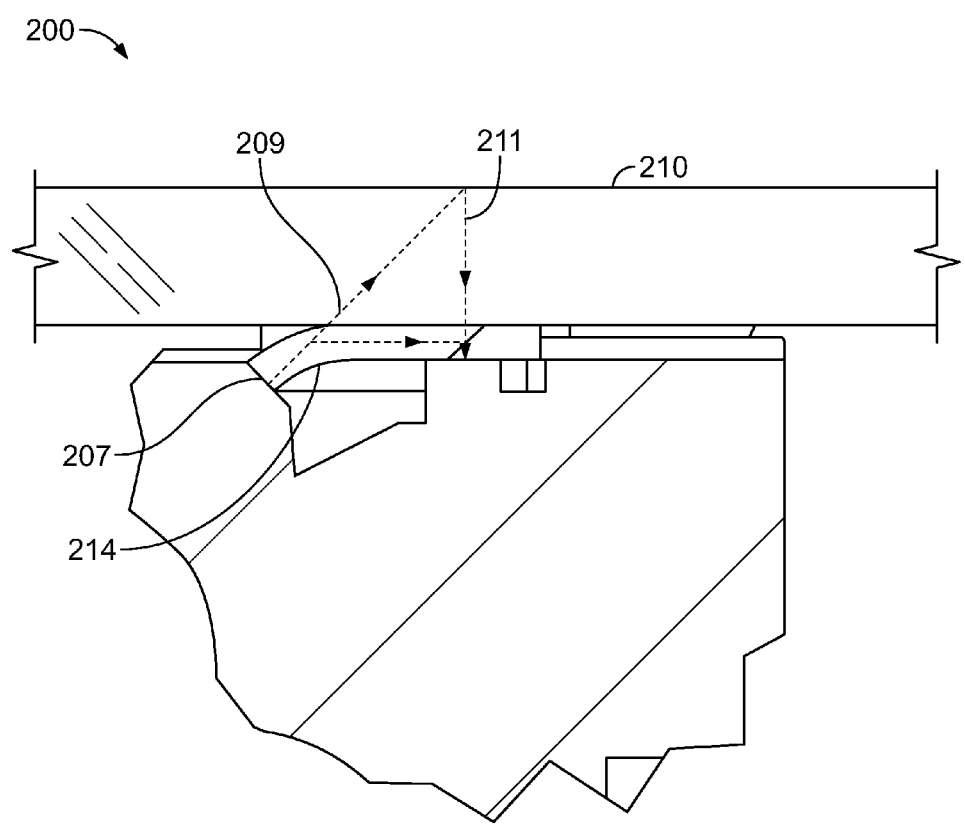
Figure 2E:
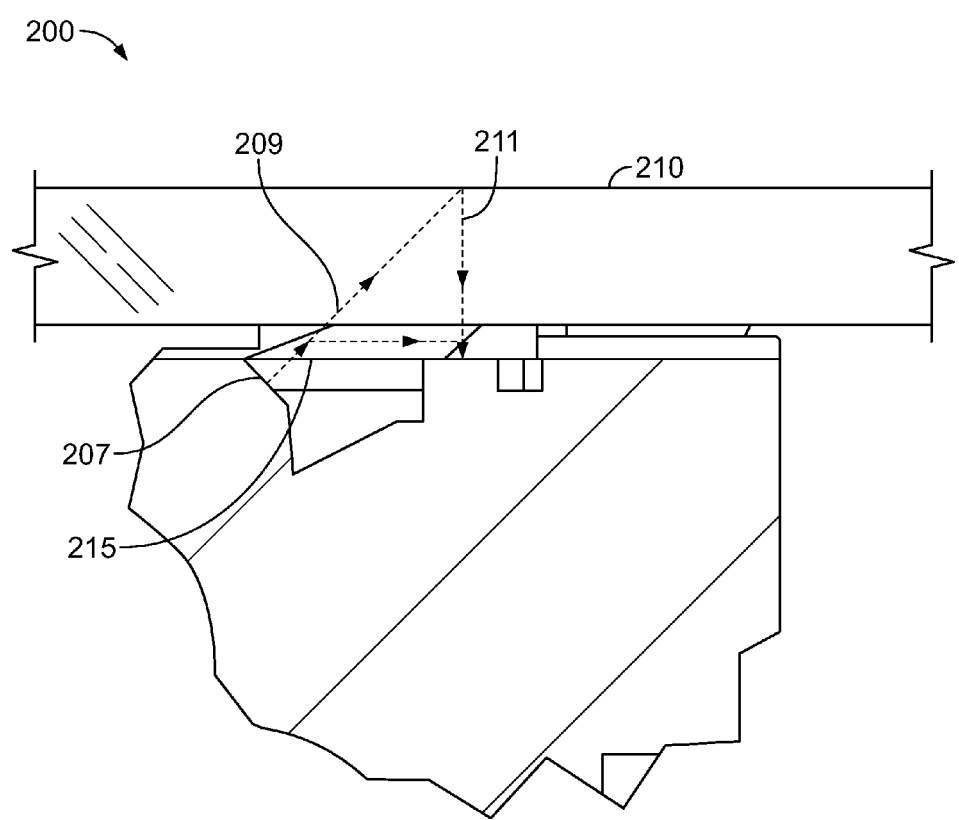
Figure 2F:
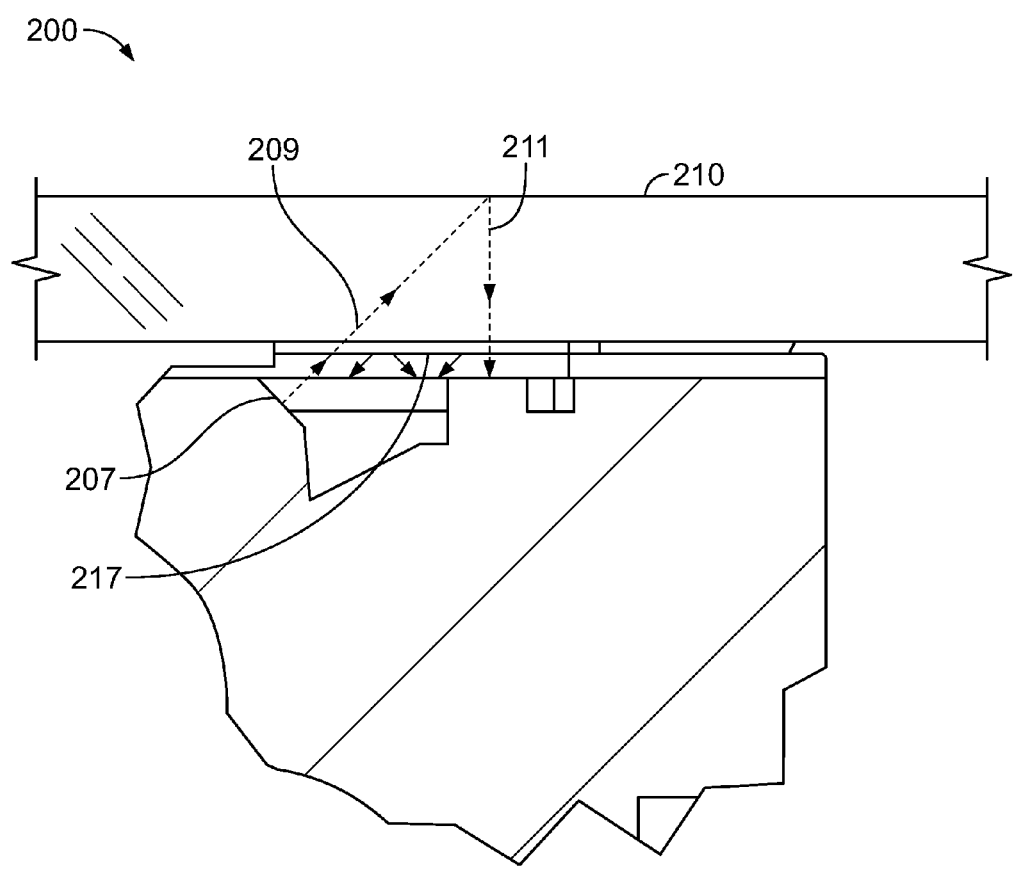

FIG. 2*b*) shows a possible position of the light-reflecting unit 206 on the CIS element 200. The light-reflecting unit 206 may be arranged in one end 216 of a CIS element 200, and the light-reflecting unit 206 may cover a part of the light guide 204 and a part of the array of rod lenses 202. The remaining part of the light guide 204 and the rod lens array 202, which is not covered by the light-reflecting unit 206, is used for normal scanning of an object.

Figure 3:
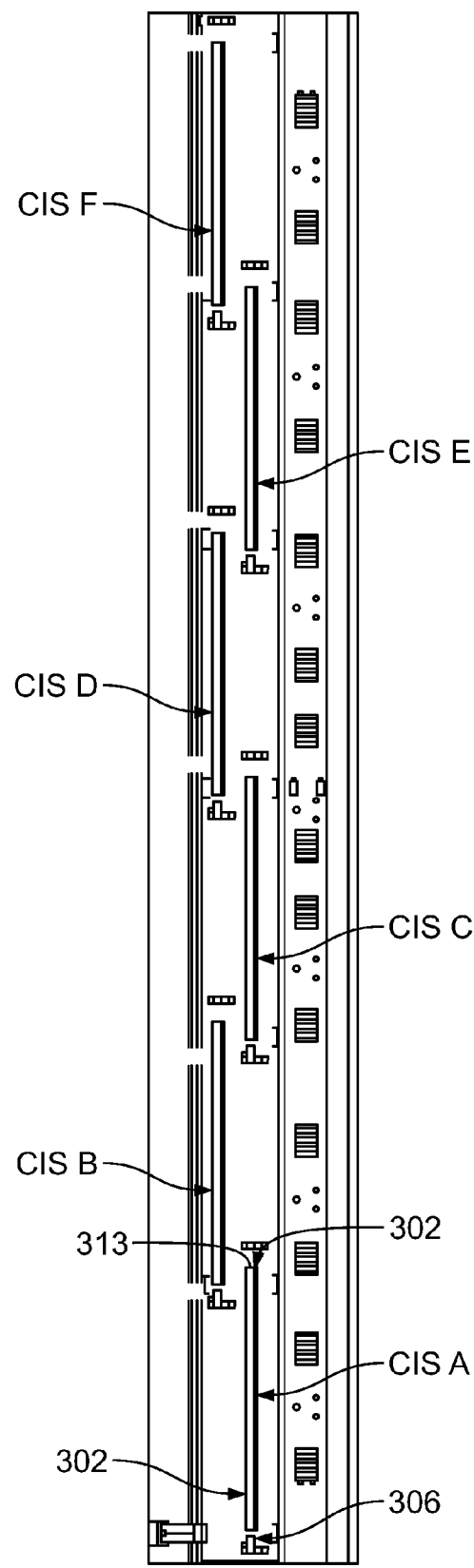
FIG. 3 shows an example of an arrangement of a number of CIS elements in a large format scanner.

FIG. 3 shows an example of an arrangement of a number of CIS elements in a large format scanner. The figure shows 6 CIS elements denoted CIS A-CIS F, which are arranged in a zig-zag pattern which results in the CIS elements having a certain overlap 313 of their longitudinal axis, and some of the photo sensors in each or some of the CIS elements are therefore not used for scanning, since this physical overlap results in an overlap between e.g. image A from CIS A and image B from CIS B. Even though the overlap area is indicated as 313 relative to CIS A and CIS B, it is understood that all CIS elements may have overlap areas corresponding to 313.

By placing a light-reflecting unit 306 on all CIS elements in the respective overlap areas corresponding to 313, it is possible to measure the light intensity for each CIS element and compensate for the light intensity of each CIS element in the scanned image of an object. Since the light-reflecting units 306 are placed in the overlap areas 313, they will not change or affect the imaging field of the document scanning.

In one of the ends of the zig-zag pattern of the CIS elements, one CIS element, CIS A in FIG. 3, may have a light-reflecting unit which is arranged in a position which is not an overlap area relative to another CIS element, since this CIS A element is the outermost CIS element in the scanner, whereby there is not an other CIS element to provide an overlap area with. Hence this outermost CIS element without an overlap area relative to another CIS element, may comprise a light-reflecting unit which is arranged such that it is placed outside the field which is covered by the glass plate of the scanner. Hereby, the light-reflecting unit will not shield photo sensors of the device which may be used for the optical scanning of the object. But the light-reflecting unit can still reflect light from the light guide to the corresponding photo sensors for measuring the light intensity of the light source of this CIS element.

FIG. 3 furthermore shows the rod lens array 302 of each CIS element. In this example the six CIS elements are arranged in a zig-zag pattern across the width of the scanner, and the 6 resulting images will be stitched to form an image having the width of the entire scanning area. This image may for example be 44" wide.

Even though the CIS devices are shown and mentioned as being arranged in a zig-zag pattern in the figures, the CIS devices may be arranged in any suitable pattern.

Figure 4A:
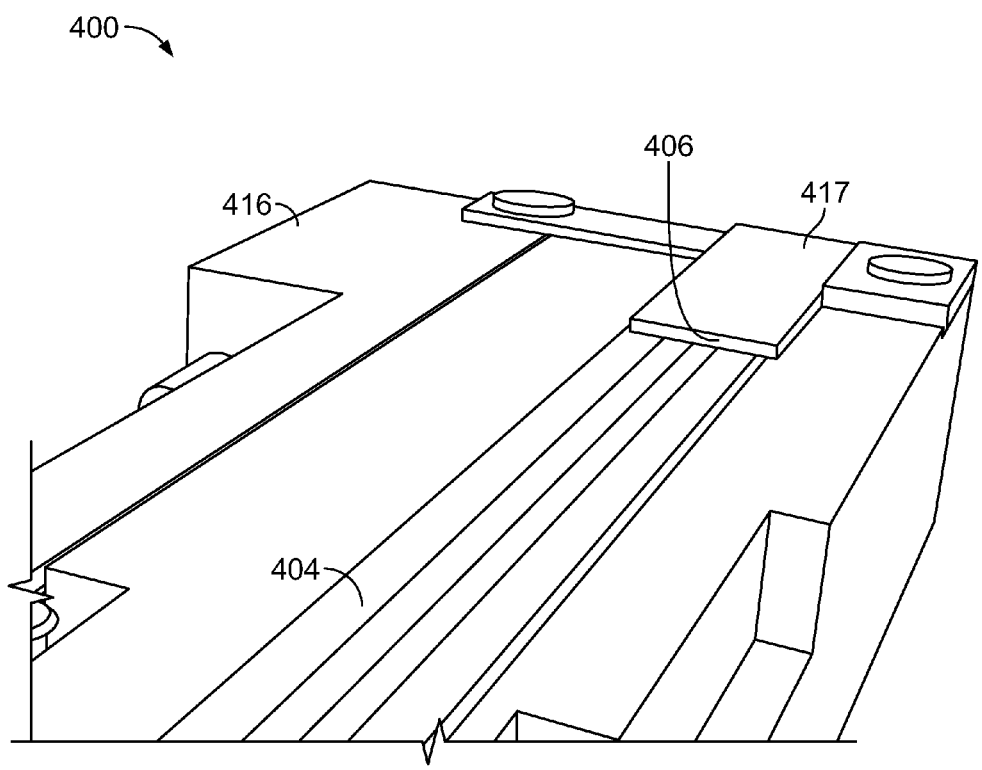
FIG. 4 shows the light-reflecting unit.

FIG. 4a shows the overlap end 416 of a CIS element 400 being provided with a light-reflecting unit (LRU) 406, i.e. a unit configured to reflect light. The LRU 406 may be a unit comprising a material 417 that reflects light, thereby ensuring that the light from the light guide 404 that hits this LRU 406 is not transmitted to e.g. the object to be scanned, but that substantially all light that hits the LRU 406 is sent directly to the one or more photo sensors corresponding to the LRU 406. This is done for measuring the light intensity of the light source, e.g. the LEDs. By transmitting a portion of light from the light guide 404 to some of the photo sensors by means of the LRU 406, a measure of the light intensity of the light source can be performed, since this portion of the light is not changed, as is light used to scan the document.

Figure 4B:
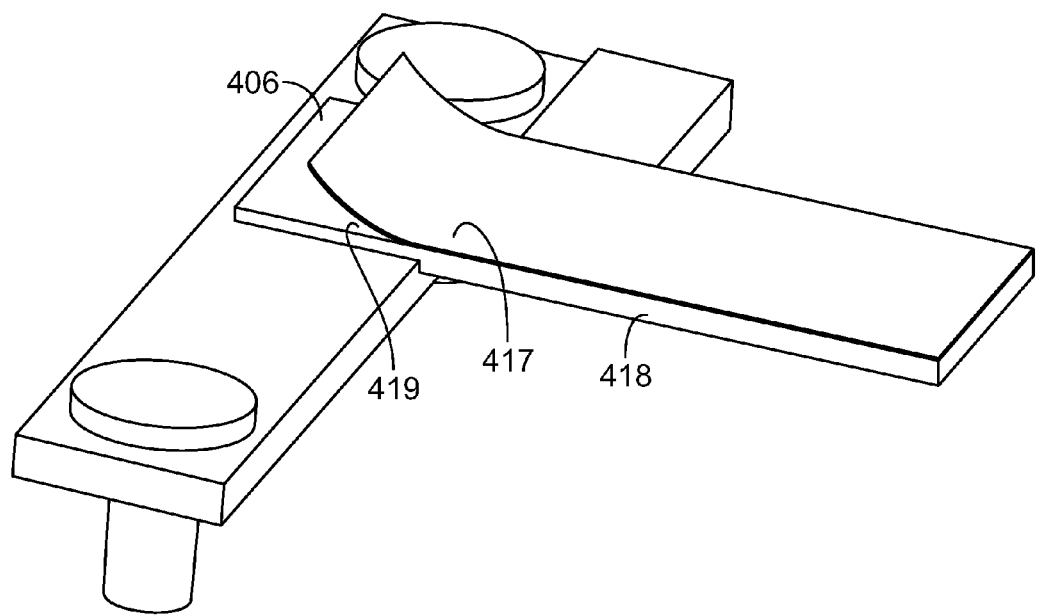

FIG. 4b) shows that the light-reflecting unit 406 may comprise or be covered with or coated by a material 417, which has light-reflecting properties. The material 417 may be an optical lighting film with "mirror tape" on one side, which reflects about 93% of the light interacting with it, and with "opal glass" or "opal plastic" on the other side for directing the light to the rod lenses and photo sensors corresponding to the LRU 406. The optical lighting film may be a 3M 2301 Optical Lighting Film or other films in that 3M family. The 2301 Optical Lightning Film has 90° prisms on one side and is smooth on the other side. The 2301 Optical Lightning Film may simultaneously be reflective or transmissive depending upon the angle at which a light ray strikes the surface of the film. Light rays striking the smooth surface of the film at angles up to about 27.6° of the axis of the prisms will be reflected, while light rays striking the film at angles greater than about 27.6° will be transmitted. Alternatively, the material may be a 3M 3635 Light Enhancement Film or other films in that 3M family, or it may be an Axpet opal 130 (opaque with polyester), or it may be a Rianyl opal (opaque white PMMA (Polymethyl methacrylate)), or it may be a Lexan 123 R111 (polycarbonate opaque-white), or it may be a 3M 850 Reflective tape 3 micron and/or other material with corresponding optical properties. Alternatively, the LRU 406 may be chromed or galvanized except on the side 418 pointing down towards the rod lenses. The LRU 406 should then preferably be made of opaque ABS (Acrylonitrile butadiene styrene) in order to enable chroming/galvanizing of this part. Alternatively and/or additionally, the LRU 406 may be black on the top side 419 in order to avoid disturbing the scanning light ray path of the CIS element.

By providing an optical feedback path where light from the light guide may be sent to the one or more photo sensors which are not used for scanning, it is possible to obtain a measurement of the light intensity of the light source. This measurement can be used to compensate for aging and temperature variations of the light source.

The compensation may be performed as follows: The light-reflecting unit transmits the light from the light source in the CIS element to at least one of the photo sensors. A pre-calibration of the scanning device provides that the system contains information about the light output after stabilization of the light source. The light output may be defined as being stabilized at infinite time, i.e. in the limit where time goes towards infinity. In the light compensating or correcting part of the system the output is incremented or decremented, so that the measured light output corresponds with the light at infinite time. This compensation or correction is performed on all pixels of the CIS element, and the result is thereby that the CIS element is completely light-compensated.

FIGS. 4a and 4b show that the LRU 406 may be T-shaped and may be mounted by being attached to the CIS element in one end 216 of the CIS element, where this end may be defined as the overlap end. The LRU may have any other suitable shape than a T-shape, e.g. such as a J-shape, an H-shape etc. The LRU should have a shape so that it covers a part of the light guide and a part of the rod lens array and thereby also covers a part of the photo sensor array.

Alternatively, the LRU may be mounted at a different position on the CIS element than at an end, e.g. at the center of the CIS element or between the center and one of the two ends of the CIS element. Depending on in which pattern the CIS elements are arranged relative to each other, two CIS elements may be overlapping at other portions than only at one end of each of the CIS elements.

Alternatively, the LRU may be mounted at any suitable position at the glass plate of the scanner, on the side opposite of the side where the document to be scanned is placed, whereby the LRU will reflect light from the light guide before it would have hit the glass plate and thereby the document to be scanned. Alternatively, the LRU may be mounted in any suitable way on or in relation to CIS elements of the scanner.

Additionally, each CIS element may have one LRU, or only some of the CIS elements may have an LRU. Furthermore, more CIS elements may share the same LRU which then, in this case, may be so large as to cover all of the CIS elements belonging to that LRU. Furthermore, one CIS element may have more than one LRU belonging to it, whereby the light intensity can be measured at different positions for the same CIS elements.

An LRU may be related to one or more corresponding rod lenses and one or more corresponding photo sensors in order to detect the light intensity of the light source.

A data processing device may extract the optical feedback signal, i.e. the light intensity measure, from the image data of the scanning in order to compensate for the light intensity of the light source.

A black level signal may be taken into account by a different component relating to the optical scanner, other than the CIS element of the invention.

Figure 4C:
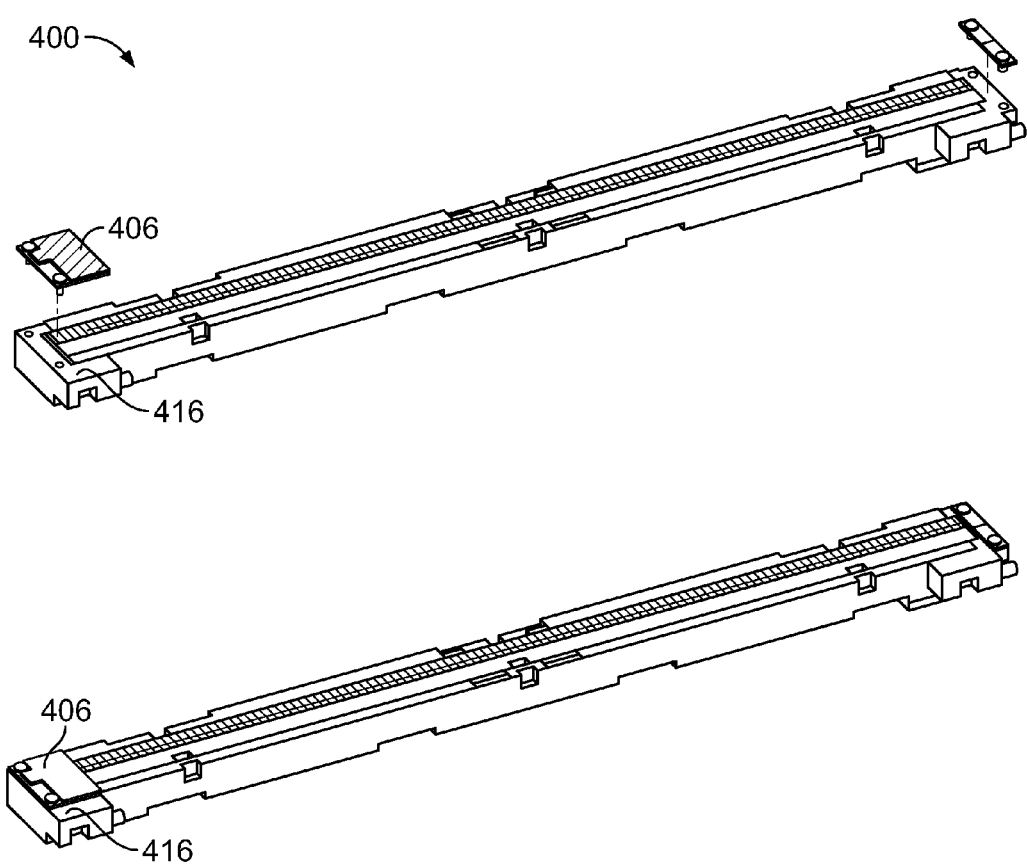

FIG. 4c) shows a CIS element 400 provided with a light-reflecting unit (LRU) 406, i.e. a unit configured to reflect light, for ensuring that the light from the light guide that hits this light-reflecting unit 406 is not transmitted to e.g. the object to be scanned, but that substantially all light that hits the light-reflecting unit 406 is sent directly to the one or more photo sensors corresponding to the light-reflecting unit 406. The light-reflecting unit 406 here in FIG. 4c) has a bigger area than the light-reflecting unit shown in e.g. FIG. 4a). The bigger reflective area may result in that the light-reflecting unit provides better shielding against undesired light. The light may be stray light not originating from the light guide of the CIS illumination system. Thus the light-reflecting unit is more immune from stray light. The light-reflecting unit with the bigger reflective area can be used to avoid stray, false or undesired light which can get past the edges of the light-reflecting unit. The light-reflecting unit 406 may cover a relatively large part of the end 416 of the CIS element.

The top figure in FIG. 4c) shows the light-reflecting unit 406 separated from the CIS element 400, and the bottom figure in FIG. 4c) shows the light-reflecting unit 406 placed on the CIS element 400.

Figure 5:
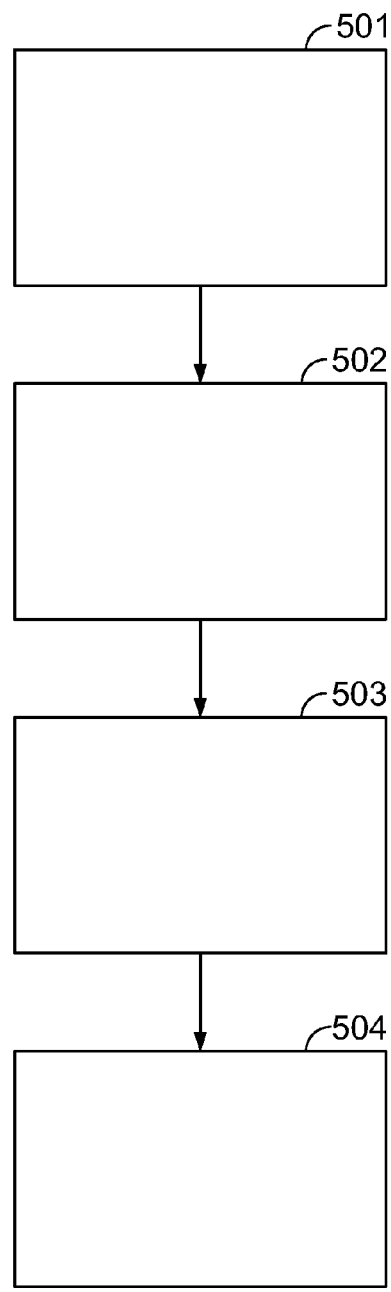
FIG. 5 shows a flowchart of an example of the optical feedback mechanism in a CIS element in relation to the invention.

FIG. 5 shows a flowchart of an example of the optical feedback mechanism in a CIS element in relation to the invention.

In step 501 optical scanning is performed, comprising the steps of:

detecting light incident on a plurality of photo sensors by means of the photo sensors, the light being emitted from a light source and reflected from an object subject to optical scanning.

Furthermore, in step 501, light which is received from the light source in the device is reflected by means of a light-reflecting unit to at least one of the plurality of photo sensors in the device; and the at least one of the photo sensors is shielded from light reflected from the object by means of the light-reflecting unit. In step 502, image data is outputted from the photo sensors in the CIS element and is used for recording an image of the scanned object, and image pixels are outputted from the at least one of the photo sensors, where light reflected from the light-reflecting unit is sent to. The image pixels which are not used for scanning, are used for providing the optical feedback. In step 503, the feedback signal provided by means of the light-reflecting unit is extracted from the image data of the scanning by means of a data processing device. In step 504, the extracted feedback signal is used for compensating the image data from the scanned image by compensating for the light intensity of the scanned image.

Figure 6:
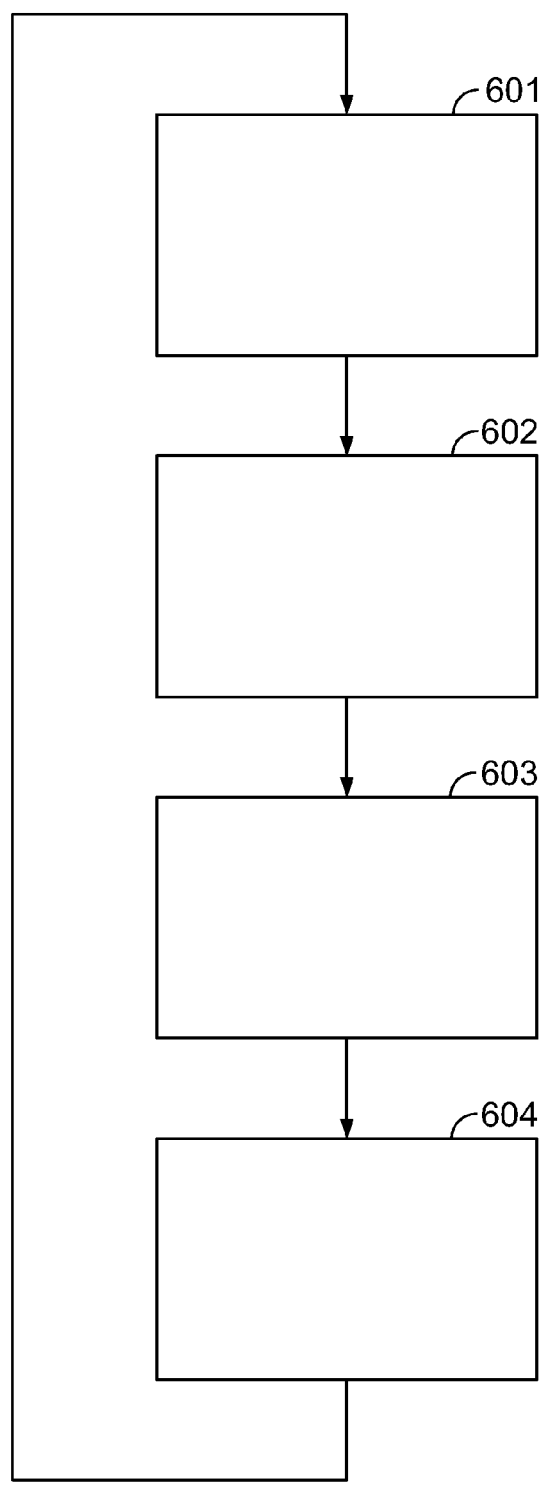
FIG. 6 shows a flowchart of an example of the optical feedback mechanism in a CIS element in relation to the invention.

FIG. 6 shows a flowchart of an example of the optical feedback mechanism in a CIS element in relation to the invention. In step 601 optical scanning is performed, comprising the steps of:

detecting light incident on a plurality of photo sensors by means of the photo sensors, the light being emitted from a light source and reflected from an object subject to optical scanning. Furthermore, in step 601 light which is received from the light source in the device, is reflected by means of a light-reflecting unit to at least one of the plurality of photo sensors in the device; and the at least one of the photo sensors is shielded from light reflected from the object by means of the light-reflecting unit.

In step 602 image data is outputted from the photo sensors in the CIS element and is used for recording an image of the scanned object, and image pixels are outputted from the at least one of the photo sensors, where light reflected from the light-reflecting unit is sent to. The image pixels which are not used for scanning are used for providing the optical feedback.

In step 603, the feedback signal provided by means of the light-reflecting unit is extracted from the image data of the scanning by means of a data processing device. In step 604, the extracted light feedback is then communicated to the light source control for adjusting/controlling the light intensity of the light source in the next scan.

Although some embodiments have been described and shown in detail, the invention is not restricted to them, but may also be embodied in other ways within the scope of the subject matter defined in the following claims. In particular, it is to be understood that other embodiments may be utilised, and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A device for optical scanning, comprising:
an array of photo sensors with a plurality of first photo sensors and, as a portion of said array, at least one second photo sensor located at an end of said array, where the first photo sensors are arranged to detect light incident on the photo sensors, emitted from a light source and reflected from an object subject to optical scanning; one or more units arranged at the end of the array to:
transmit light received from the light source to the at least one second photo sensor; and
shield the at least one second photo sensor from substantially all the light reflected from the object, so that the amount of light received at the at least one second photo sensor is:
to a larger extent light transmitted from the light source; and
to a smaller extent light reflected from the object, and wherein at least one of the one or more units provides that light exits the at least one unit as specularly reflected light and/or diffuse light.

2. A device according to claim 1, wherein at least one of the one or more units has two opposite faces, one facing the at least one photo sensor and the light source, the other facing the object to be scanned.

3. A device according to any of claim 1, wherein at least one of the one or more units has such extent so as to cover a part of said device.

4. A device according to any of claim 1, wherein at least one of the one or more units is adapted to provide an optical feedback used for measuring the light intensity of the light source.

5. A device according to any of claim 1, wherein measured light intensity is used to compensate an output of the optical scanning.

6. A device according to claim 5, wherein compensating an output comprises compensating an output from the plurality of photo sensors.

7. A device according to claim 5, wherein compensating an output comprises controlling/compensating a light source control/output of the light source.

8. A device according to claim 1, wherein the device is arranged in a pattern with a number of other similar devices, whereby at least two or more of the devices have mutual overlap areas.

9. A device according to claim 1, wherein part of said device which at least one of the one or more units covers is a part of said device which is in an overlap area in relation to a second device, whereby the overlap area of one of the devices is not used for scanning the object.

10. A device according to claim 1, wherein at least one of the one or more units is at least partially covered with a reflective material.

11. A device according to claim 10, wherein the reflective material is at least partially an optical lightning film.

12. A device according to claim 11, wherein the optical lightning film is at least partially a polycarbonate film.

13. A device according to claim 1, wherein at least one of the one or more units at least partially comprises an opaque white plastic material.

14. A device according to claim 1, wherein at least one of the one or more units is at least partially chromed with a reflective material.

15. A device according to claim 1, wherein at least one of the one or more units transmits light by means of one or more reflectors.

16. A device according to claim 15, wherein at least one of the one or more reflectors is a mirror.

17. A device according to claim 15, wherein at least one of the one or more reflectors is a reflective foil.

18. A device according to claim 15, wherein at least one of the one or more reflectors is a metallised plastic.

19. A device according to claim 1, wherein at least one of the one or more units comprises a light guide.

20. A device according to claim 19, wherein the light guide is a prism light guide.

21. A device according to claim 1, wherein at least one of the one or more units comprises a light pipe.

22. A device according to claim 1, wherein a silk-screen printed white patch of one of the one or more units provides diffuse reflected light.

23. A device according to claim 1, wherein a matte face of one of the one or more units provides diffuse reflected light.

24. A device according to claim 1, wherein at least one of the one or more units is attached at one end of the device.

25. A device according to claim 1, wherein the light source comprises one or more light-emitting diodes.

26. A device according to claim 1, wherein the device is a contact image sensor.

27. A device according to claim 1, wherein the device further comprises:
a light guide which directs the light from the light source to illuminate the object subject to scanning;
an array of rod lenses for collecting and directing the light that is reflected back from the object; and
where the plurality of photo sensors are arranged in an array and are adapted to receive the light from the rod lenses.

28. A device according to claim 27, wherein the rod lenses are arranged in a pattern with parallel rows of lenses, where the lenses in a row are displaced relative to the lenses in a neighbour row.

29. A device according to claim 27, wherein the rod lenses are SELFOC lenses.

30. A scanner comprising a number of devices according to claim 1.

31. A scanner according to claim 30, wherein multiple devices are arranged in a pattern whereby at least two or more of the devices are arranged in a parallel direction and with mutual overlap in the parallel direction, and wherein the at least second photo sensor of an array is located within the overlap.

32. A method for optical scanning, comprising the steps of:
(a) detecting light incident on an array of photo sensors with a plurality of first photo sensors and, as a portion of said array, at least one second photo sensor located at an end of said array, where the first photo sensors are arranged to detect light incident on the photo sensors, the light being emitted from a light source and reflected from an object subject to optical scanning; one or more units arranged at the end of the array to:
transmit light received from the light source to the at least one second photo sensor; and
shield the at least one second plate sensor from substantially all the light reflected from the object; and
(b) receiving at the least one second photo sensor an amount of light which is:
to a larger extent light transmitted from the light source; and
to a smaller extent light reflected from the object; and wherein at least one of the one or more units provides that light exits the at least one unit as specularly reflected light and/or diffuse light.

33. A scanner comprising multiple devices for optical scanning wherein each device comprises: an array of photo sensors with a plurality of first photo sensors and, as a portion of said array, at least one second photo sensor located at an end of said array, where the first photo sensors are arranged to detect light incident on the photo sensors, emitted from a light source and reflected from an object subject to optical scanning; one or more units arranged at the end of the array to: transmit light received from the light source to the at least one second photo sensor; and shield the at least one second photo sensor from substantially all the light reflected from the object, so that the amount of light received at the at least one second photo sensor is: to a larger extent light transmitted from the light source; and to a smaller extent light reflected from the object, and wherein the multiple devices are arranged in a pattern whereby at least two or more of the devices are arranged in a parallel direction with mutual overlap in the parallel direction, and wherein the at least second photo sensor of an array is located within the overlap.

* * * * *